United States Patent [19]

Blankenburg et al.

[11] Patent Number: 5,289,941

[45] Date of Patent: Mar. 1, 1994

[54] RECONFIGURABLE ARTICLE STORAGE CONTAINER

[75] Inventors: Karl Blankenburg, Warren; Mitchell M. Marchi, Bloomfield Hills, both of Mich.

[73] Assignee: The American Team, Mt. Clemens, Mich.

[21] Appl. No.: 974,206

[22] Filed: Nov. 10, 1992

[51] Int. Cl.⁵ ............................................. B65D 21/02
[52] U.S. Cl. ................................... 220/552; 220/533; 220/528; 220/4.33; 220/4.31; 206/821
[58] Field of Search .................... 224/42.42; 206/821; 220/552, 532, 533, 529, 528, 23.2, 23.4, 23.6, 4.31, 4.33, 4.28, 1.5; 217/7, 12 R, 43 R

[56] References Cited

U.S. PATENT DOCUMENTS

| | | | |
|---|---|---|---|
| 2,854,103 | 9/1958 | Kruger | 220/552 |
| 3,067,903 | 12/1962 | Jones, Jr. | 220/552 |
| 3,491,909 | 1/1970 | Ikelheimer | 220/533 |
| 3,656,650 | 4/1972 | Frater | 220/552 |
| 3,837,560 | 9/1974 | Kuchuris et al. | 220/552 |
| 4,008,553 | 2/1977 | Oliver | 220/23.4 |
| 4,226,348 | 10/1980 | Dottor et al. | 224/42.42 |
| 4,303,367 | 12/1981 | Bott | 414/522 |
| 4,499,997 | 2/1985 | Swingley, Jr. | 220/552 |
| 4,595,246 | 6/1986 | Bross | 220/552 |
| 4,718,584 | 1/1988 | Schoeny | 224/42.42 |
| 4,828,132 | 5/1989 | Francis, Jr. et al. | 220/1.5 |
| 4,832,242 | 5/1989 | Leek | 224/311 |
| 4,844,305 | 7/1989 | McKneely | 224/42.42 |
| 4,911,296 | 3/1990 | Hart, Jr. | 206/373 |
| 4,944,544 | 7/1990 | Dick | 296/37.1 |
| 5,025,964 | 6/1991 | Phirippidis | 224/42.42 |
| 5,052,580 | 10/1991 | Khoury | 220/505 |
| 5,054,668 | 10/1991 | Ricchiuti | 224/42.42 |
| 5,065,922 | 11/1991 | Harris | 224/42.32 |
| 5,094,375 | 3/1992 | Wright | 224/42.42 |

FOREIGN PATENT DOCUMENTS 2067520 7/1981 United Kingdom ................ 220/552

Primary Examiner—Allan N. Shoap
Assistant Examiner—S. Castellano
Attorney, Agent, or Firm—Basile and Hanlon

[57] ABSTRACT

A reconfigurable article storage container includes a plurality of identical panels, each including at least two slots formed by connector webs integrally formed with and extending between adjacent panel sections forming each panel. Certain panels are invertible 180° and oriented perpendicular to adjacent panels such that interconnecting slots formed by the connector webs between adjacent panel sections of each panel can be slidably engaged to form any polygonal or irregular shaped storage container having any number and size of individual storage compartments formed therein between certain of the interconnected panels. Edge connectors interconnect the ends of two panels in a co-linear arrangement to increase the length of any wall of the storage container. Vertical connectors are insertable into aligned slots formed between the connector webs of two stacked panels and extend between the two panels to join the two panels in a vertical stack arrangement to increase the height of any wall of the article storage container.

16 Claims, 4 Drawing Sheets

RECONFIGURABLE ARTICLE STORAGE CONTAINER

BACKGROUND OF THE INVENTION

1. Field of the Invention

The present invention relates, in general, to article storage containers, and specifically, for article storage containers for use in vehicle storage compartments.

2. Description of the Art

Trunks, storage compartments and beds of vehicles, trucks, vans, etc., are designed with a large open area between the surrounding vehicle body structure and the underlying floor to receive various articles or cargo therein. Oftentimes, small articles, such as grocery bags, bottles, and loose articles not in bags or boxes are placed in a vehicle trunk or storage compartment. Such small articles are susceptible to movement during operation of the vehicle which can result in noise and damage to the articles and/or the vehicle.

In an effort to overcome this problem, netting has been secured to the rear wall panel of vehicle trunks and supported via elastic straps to provide an expandable compartment for receiving such small items, such as grocery bags, bottles, etc. However, the netting extends openly across the width of the trunk and is not capable of preventing movement of such articles laterally across the width of the trunk. Such netting is also expandable by only a small distance so as to be able to receive a limited number of articles therein.

Fixed article containers have also been designed for use in vehicle trunks or storage compartments. Such containers are typically provided with a fixed overall dimension or size and include a number of individual compartments therein. Certain of these containers are provided with removable dividers so as to enable the individual storage compartments to be adjusted in size to receive various sized articles. Such article containers have also been provided in a foldable or collapsible form so as to be able to collapsed to a small volume, non-use position. Generally, however, such fixed article containers have a predetermined outer peripheral size, even if the individual storage compartments are adjustable by means of movable dividers. As such, such fixed size containers consume a majority of the space available in a vehicle trunk or storage area.

U.S. Pat. No. 5,052,580 to Khoury discloses a vehicle cargo storage organizer formed of a plurality of first and second sized wall panels which are interconnectible in various arrangements to form individual storage compartments therebetween for storing articles. Each of the first and second sets of wall panels is provided with slots arranged alternately and oppositely in a spaced-apart manner along the length and opposite side edges of each wall panel. Any two wall panels may be interconnected to each other by sliding adjoining slots of the two wall panels together when the wall panels are arranged in a perpendicular orientation with respect to each other. Elastic cords with resilient bulb ends may be attached between ports formed on each of the wall panels to connect two of the wall panels together.

While the Khoury vehicle cargo storage organizer may be reconfigured to provide individual article storage compartments of a predetermined size and in a predetermined number to suit the needs of a user or to fit within a particular size vehicle storage compartment, such an organizer is provided with two different sized wall panels. This increases the overall cost of such a vehicle cargo storage organizer as a number of different parts must be manufactured for the organizer. In addition, assembly of the cargo storage organizer is more complicated since thought and time must be expended by a user to determine exactly where each of the different wall panels can be optimally positioned.

Thus, it would be desirable to provide an article storage container for vehicles which may be easily reconfigurable in overall size and shape and with the desired number and size of individual storage compartments formed therein. It would also be desirable to provide an article storage container which may be reconfigurable into different arrangements and number and size of individual storage compartments while using only a number of identical, single size panels. Finally, it would be desirable to provide an article storage container using a number of identically shaped panels which can be interconnected end-to-end to increase the overall length or width of the article storage container as well as being interconnectible at top and bottom edges to increase the overall height of the container or certain compartments of the container.

SUMMARY OF THE INVENTION

The present invention is a reconfigurable article storage container particularly suited for use in transporting articles in a storage compartment of a vehicle, such as an automobile, truck, van, etc.

The article container of the present invention includes a plurality of like shaped and sized panels which are interconnectible into a container of selectable size and shape to form a plurality of individual storage compartments therein. Each panel includes first and second spaced edges and first and second side ends. In a preferred embodiment, each panel is formed of a plurality of panel sections of like height, each having first and second spaced edges co-linearly arranged with the first and second edges of adjacent panel sections. The opposed side ends of each of the panel sections are spaced from the side ends of adjacent panel sections. A connector web is integrally formed with the panel sections and is disposed between two adjacent panel sections. Each connector web has a predetermined length and is spaced a predetermined distance from the second edge of two adjacent panel sections.

Each connector web forms a connector slot between two adjacent panel sections, the connector web itself and the second edges of two adjacent panel sections for releasably receiving a connector slot of another panel therein when the other panel is inverted 180° and oriented perpendicular to a first panel.

In a preferred embodiment, each panel is formed with at least three main panel sections including a centrally located panel section having the largest overall length and two outermost panel sections being of a shorter length and either having the same or identical length with respect to each other. Connector webs are integrally formed between the three panel sections. Preferably, all of the panel sections and connecting web are integrally formed as a one-piece, unitary member from molded plastic.

Preferably, the side ends of each of the panel sections are provided in a predetermined polygonal configuration, such as a partial hexagonal edge configuration in which a plurality of individual side edge faces are disposed at an interior angle of less than 90° with respect to adjacent side edge faces. This angular arrangement of side edge faces which extends between the first and second edges of each of the panel sections forms a mating surface when two panels are interconnected in a perpendicular arrangement such that the side end faces of one panel adjacent to a particular connector slot are disposed in registry with the corresponding side end faces of the interconnecting panel.

A side end connector means is releasably attachable to the outermost side ends of two panels for connecting two panels in a lengthwise extending, co-planar arrangement to increase the overall length of any wall of the article storage container of the present invention. The side end connector means preferably comprises a connector member having outwardly extending pairs of spaced legs which are complimentarily formed to the exterior shape of the panel sections so as to be releasably slid over the side end portions of two co-linearly arranged panels to connect such panels together.

Further, a vertical connector means may be provided for interconnecting two panels in a vertically stacked arrangement. The vertical connector means preferably comprises a plug configured to be releasably engageable in a connector slot formed between the connecting web and two adjacent panel sections of a panel and having a length such that a portion thereof extends outward from the panel. The outwardly extending portion is releasably engageable in a connector slot formed between adjacent panel sections of another panel so as to interconnect such panels in a co-planar, vertically extending wall.

The reconfigurable article storage container of the present invention overcomes many of the problems encountered with previously devised vehicle article storage containers in that it may be easily reconfigurable to fit the dimensions of any vehicle storage compartment as well as easily reconfigurable to receive any number of different sized and shaped articles in individual storage compartments which may be provided in any number and any size corresponding to the articles to be transported. The article storage container of the present invention is also easily disassembled for convenient storage when not in use.

The present article storage container has a low manufacturing cost since it is formed essentially of a number of identically constructed panels. Since the panels are preferably formed of molded plastic, only a single mold is required to form all of the necessary panels for a complete article storage container. By means of simple side end connectors and vertical connectors, a number of like panels may be connected end-to-end and/or vertically in a stacked arrangement to increase the overall length or height of any of the walls of the complete article storage container.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
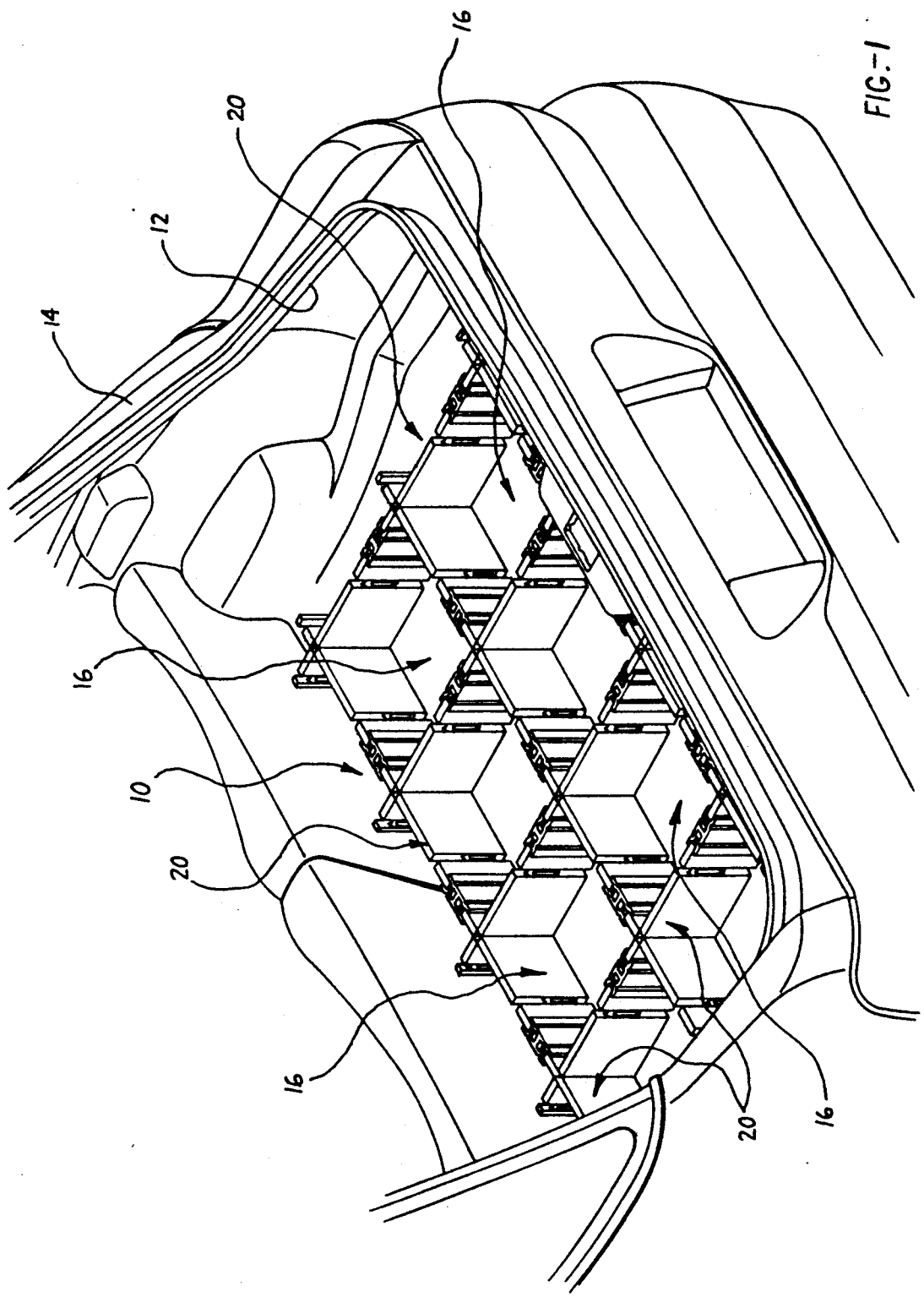
FIG. 1 is a perspective view of an article storage container of the present invention shown mounted in the trunk of an automobile.

As shown in the drawing, the present invention is a reconfigurable article storage container 10 which is designed for removable installation as well as assembly and disassembly within a vehicle storage compartment, such as the trunk 12 of an automobile 14, as shown in FIG. 1, as well as the storage compartments of trucks, vans and the like. The article storage container 10 is designed to be reconfigured into any overall dimensional size as well as with any number and size of individual article storage compartments 16. Each article storage compartment 16 may be precisely configured to receive various sized and number of articles therein to prevent such articles from moving freely throughout the vehicle storage compartment 12 so as to prevent damage to the articles as well as to the surrounding vehicle body structure.

The article storage container 10 of the present invention is formed of a plurality of identical panels, each denoted by reference number 20. One of the identical panels 20 is shown in greater detail in FIG. 2. The panel 20 is preferably formed as a one-piece, unitary member of a suitable lightweight material, such as a molded plastic. Preferably, each panel 20 is formed of a thermoplastic, such as, for example, polypropylene, polystryene, etc. Each panel 20 may have any overall height, width or depth dimension.

According to a preferred embodiment of the present invention, each panel 20 is provided with a predetermined number of individual panel sections, such as a first or central panel section 22 and a pair of outer panel sections 24 and 26. Each of the panel sections 22, 24 and 26 has the same identical height between a first edge 28 and an opposed, spaced second edge 30. By way of example only, the first panel section 22 has a longer length than the two outermost panel sections 24 and 26. The outermost panel sections 24 and 26, while shown as having identical lengths, may also be provided in unequal lengths if desired. Each of the panel sections 22, 24 and 26 also includes opposed side ends 32 and 34 which extend between the first and second edges 28 and 30.

Figure 2:
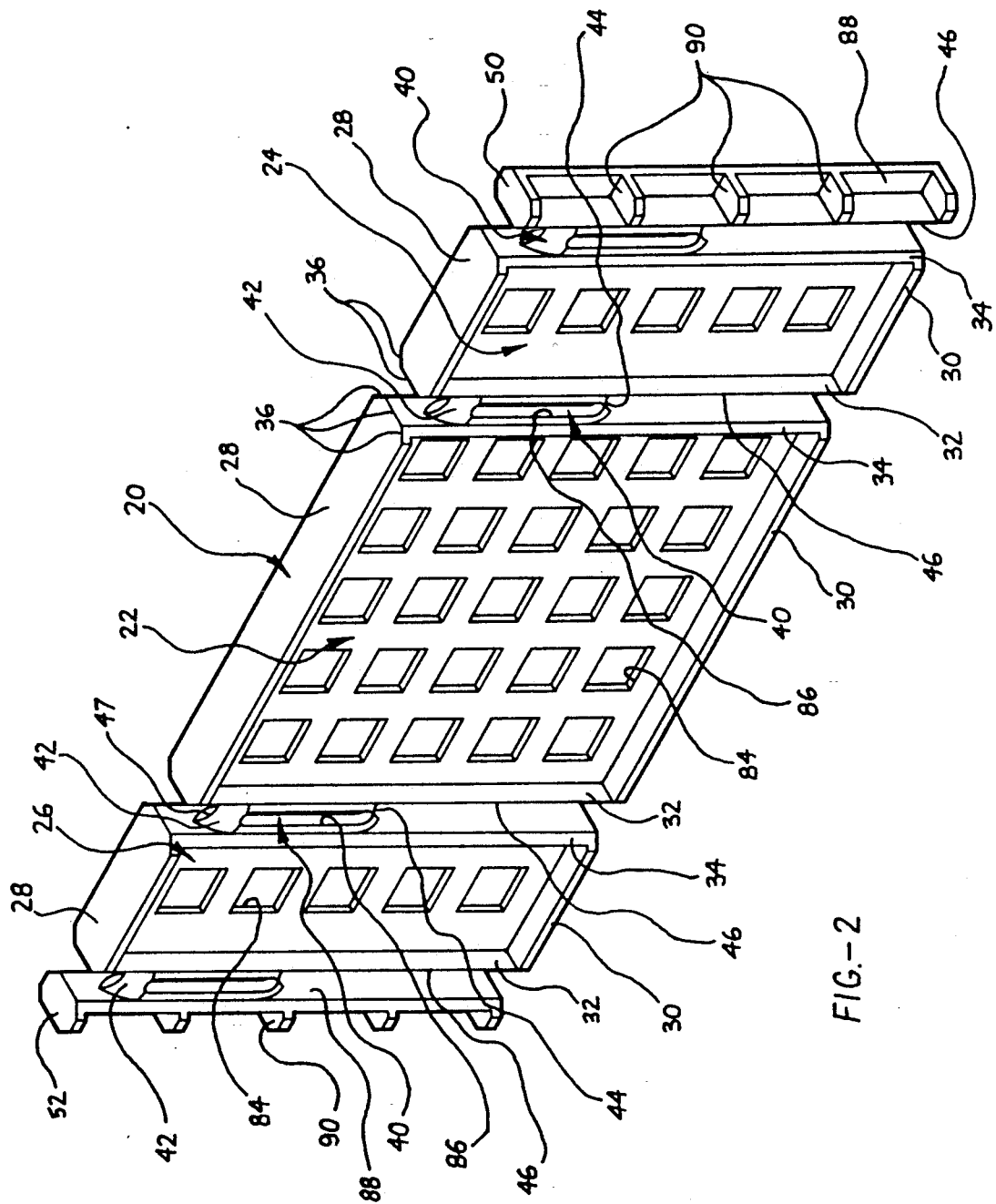
FIG. 2 is a perspective view of one of the identical panels used in the article storage container shown in FIG. 1.

By way of example only, each of the side edges 32 and 34 of each of the panel sections 22, 24 and 26 of the panel 20 is formed in a predetermined polygonal shape, such as a three-sided shape shown in FIG. 2. This forms a number of side end faces, all denoted generally by reference number 36 in FIG. 2, which have an interior angle respectively therebetween of less than 90°. The reason for this angular arrangement of the side end faces 36 will become more apparent hereafter.

A connector web 40 is integrally formed with the panel sections 22, 24 and 26 and is disposed between two adjacent panel sections, such as the connector web 40 disposed between and integrally formed with the panel sections 22 and 24 and a similar connector web 40 joined to and extending between the other side end 32 of the panel section 22 and the side end 34 of the panel section 26. Each of the connector webs 40 is identically constructed and is provided in a predetermined length between a first end 42 and a second end 44. The second end 44 of each connector web 40 is spaced from the second edge 30 of the two adjacent panel sections, such as the panel sections 22 and 24 shown in FIG. 2, to form a slot therebetween of a predetermined length, as denoted generally by reference number 46. The length of the slot 46 is preferably one-half of the height of the panel 20. The slot 46 extends from the spaced second edges 30 of two adjacent panel sections, such a panel sections 22 and 24, to the second end 44 of the connector web 40. The slot 46 acts as an interconnecting means to join two identical panels 20 together.

Another slot 47 is formed between the first end 42 of each connector web 40 and the adjacent first edge 28 of each panel section. As the first end 42 of the connector web 40 is closer to the adjacent edge of the panel 20, the slot 47 is shorter than the slot 46.

Each connector web 40 has a width approximately equal to the width of the side end face 36 to which the connector web 40 is attached. This forms a rigid fit between two panels 20 as described hereafter.

By way of example only, each panel 20 also includes outermost end panel sections 50 and 52 which are identically constructed, although each has a smaller overall cross section than the adjacent panel sections 24 and 26. Connector webs 40 are integrally joined to and extend between each of the end panel sections 50 and 52 and the adjacent panel sections 24 and 26, respectively. Interconnecting slots 46 are also formed between the adjacent disposed end panel section 50 and panel section 24 and the end panel section 52 and the adjacent panel section 26. This arrangement provide four interconnecting slots 46 along the length of each panel 20 for receiving another panel or panels therein in an interconnecting arrangement, as described hereafter. This may be employed by a user to vary the size and shape of the individual storage compartments formed between a number of interconnected panels 20 as well as the overall size and shape of the complete article storage container 10.

Figure 3:
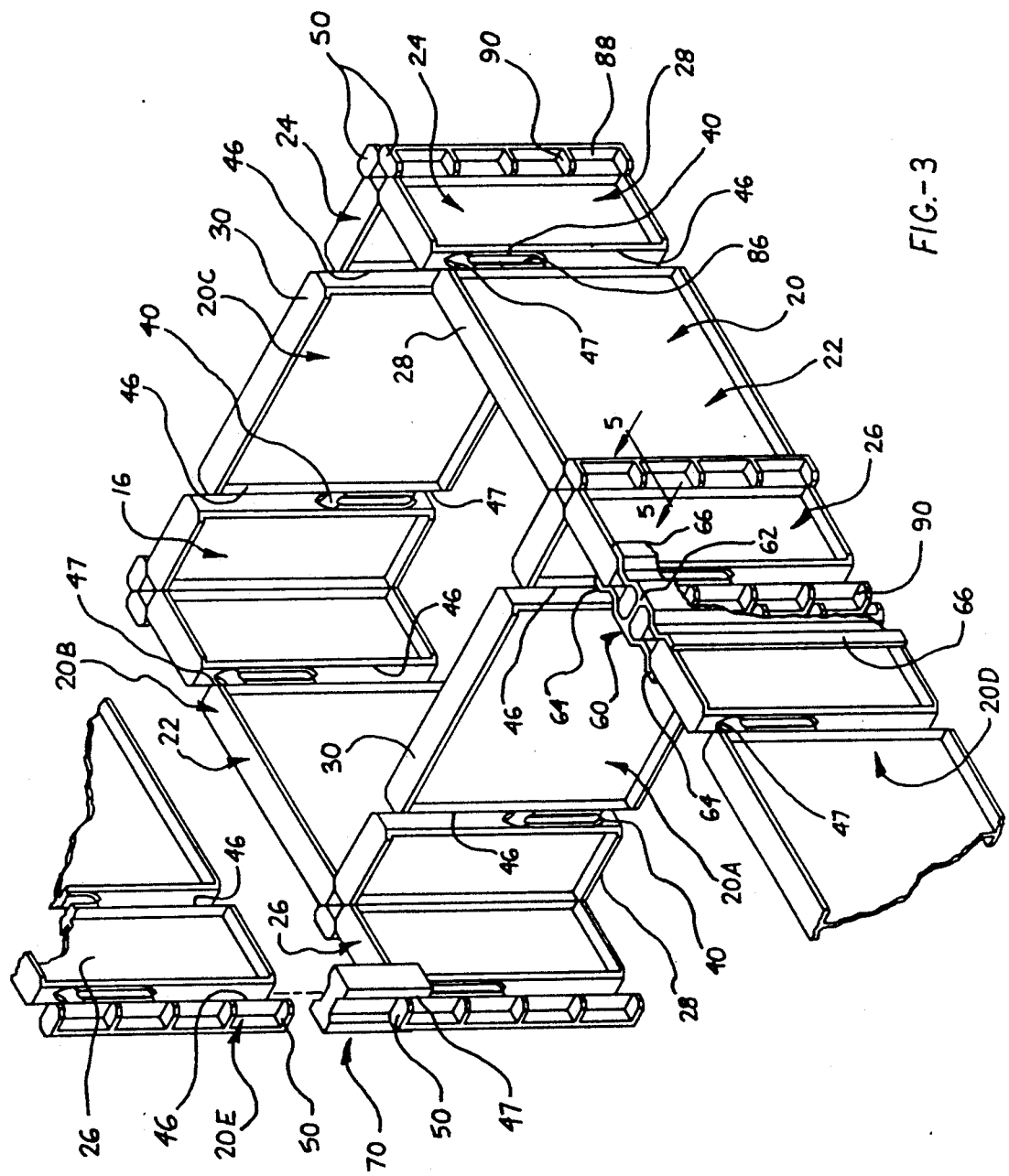
FIG. 3 is an exploded, perspective view showing the interconnection of a number of like panels of the article storage container of the present invention.

FIG. 3 shows the interconnection of a number of like panels 20 into the overall article storage container 10. It will be understood that only a portion of the complete article storage container 10 is shown in FIG. 3. Further, for reasons of clarity, each identical panel 20 is depicted by a different reference numeral, such as 20, 20A, 20B, 20C, 20D, 20E and 20F, so as to be able to differentiate between the orientation and position of each identical panel 20. In interconnecting each panel 20 to one or more other panels 20, a first panel 20, as shown in FIG. 3, will be oriented in such a manner that the interconnecting slots 46 formed by the connector webs 40 between adjacent panel sections 22, 24 and 26 will be extending downward. It will be understood that this orientation is by way of example only as the panel 20 could be inverted with the interconnecting slot 46 extending upward.

A second panel 20A is inverted 180° from the orientation of the first panel 20 and positioned perpendicular to the first panel 20 as shown in FIG. 3. In this orientation, the connecting slots 46 in the second panel 20A extend upward from the respective connector webs 40 in an opposite direction from the corresponding connecting slots 46 in the first panel 20. The two panels 20 and 20A are urged together by sliding one of the connecting slots 46 in the second panel 20A through one of the connecting slots 46 in the first panel 20 as shown in FIG. 3 until the connecting webs 40 on each of the panels 20 and 20A in the respective connecting slots 46 are disposed in contact with each other. Since a panel section on each of the panels 20 and 20A extends outward from the joint of two interconnected slots 46, the two panels 20 and 20A are held in a fixed, perpendicular orientation with respect to each other. This rigid engagement between two panels, such as panels 20 and 20A, is enhanced by the angular side end faces of each panel section which securely engages the side end faces of the interconnected panel. At the same time, the panels 20 and 20A may be easily separated for repositioning or storage.

Panel 20C is oriented in the same manner as panel 20A with the interconnecting slots 46 formed therein extending upward from the respective connector webs 40. The panel 20C may be interconnected to a slot 46 in the first panel 20, such as at the interconnecting slots 46 formed between an end panel section 50 of each of the panels 20 and 20C and the adjoining panel section 24. Panel 20B may be interconnected between the panels 20A and 20C in a similar manner by means of the connecting slots 46. The panel 20B is oriented in the same manner as the panel 20 with the interconnecting slots 46 formed therein extending downward as shown in FIG. 3. It should be noted that the interconnection of the panel 20A to the panels 20 and 20B is at the interconnecting slot 26 formed between the first panel section 22 of each of the panels 20 and 20B and the adjacent panel section 26 of each of the panels 20 and 20B.

The thus described interconnection of the panels 20, 20A, 20B and 20C forms a rectangular box in which the interior thereof forms an article storage compartment denoted by reference number 16. The size of the storage compartment 16 could be varied by using a different slot 46 for interconnecting two panels 20.

Figure 5:
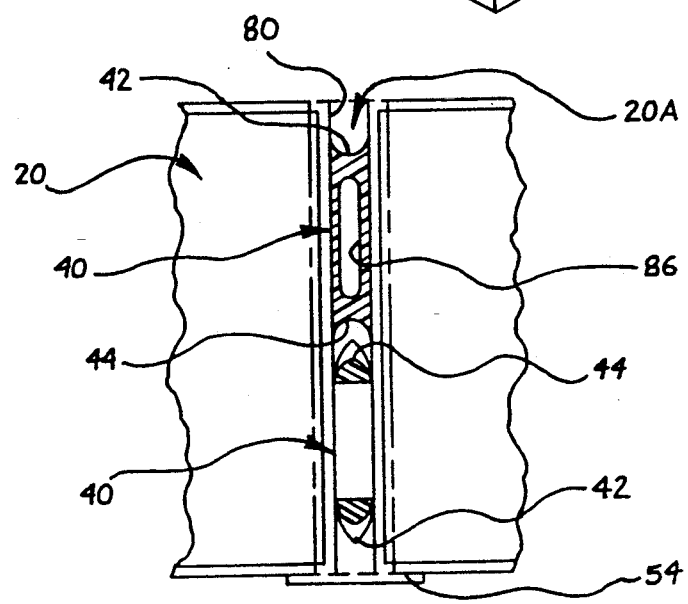
FIG. 5 is a cross sectional view generally taken along line 5—5 in FIG. 3.

Another feature of the present invention is shown in FIG. 5 in which a suitable fastening means 54 is employed to releasably hold the entire article storage container 10 in a fixed position in a vehicle storage compartment 12. The fastener 54, in an exemplary embodiment, comprises a VELCRO-type fastener which is releasably engageable with the type of carpeting typically found in an automobile trunk or storage compartment. In this manner, once the article storage container 10 has been configured to the desired shape and with the desired number and size of individual storage compartments 16, the fasteners 54 which may be provided on the second edges 30 of certain of the panels 20 may be employed to retain the article container 10 in a fixed position without any movement during operation of the vehicle.

Figure 4:
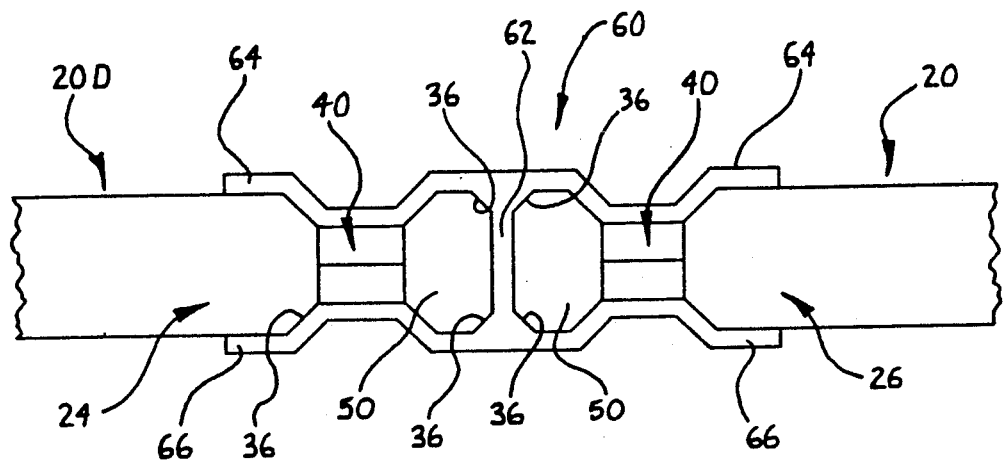
FIG. 4 is a plan view of the side end connector means interconnecting two panels in a lengthwise, co-planar arrangement as generally shown in FIG. 3.
Figure 6:
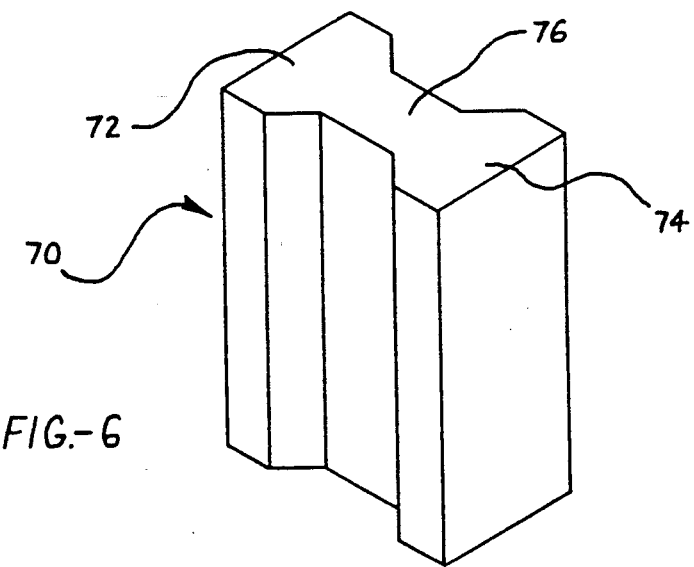
FIG. 6 is a perspective view of a vertical connector means shown generally in FIG. 3.

Another feature of the present invention is shown in FIG. 3 and in greater detail in FIG. 4. This feature involves a length extender in the form of a side edge connector means 60. The side edge connector means 60 is a body having a central solid portion 62 which is slidably disposable in the space formed between two adjacent, side end to side end positioned panels, such as panels 20 and 20D shown in FIGS. 3 and 4. A pair of spaced legs 64 and 66 extends outward from each side of the central portion 62. The legs in each pair of legs 64 and 66 are spaced apart and have a configuration complementary to the exterior configuration of adjacent disposed panel sections, such as panel sections 24 and 50 in the panel 20D and the panel sections 50 and 26 in the panel 20. As noted above, a polygonal shape is provided on the side edges of each of the panel sections of each panel and includes individual side edge faces 36. The legs 64 and 66 of each pair of legs on the connector 60 are formed at similar angles so as to releasably engage and retain adjacently disposed side ends of two panels, such as panels 20 and 20D, in an end-to-end lengthwise extending, co-linear arrangement. In this manner, any number of panels 20 may be interconnected end-to-end to increase the overall length of any of the side walls or intermediate walls of the article container 10. It should be noted that the side edge connector means 60 has the same length as that of the panels 20. A shorter length may also be employed.

A vertical connector means denoted by reference number 70 in FIGS. 3 and 5 may also be provided for connecting two panels, such as panels 20B and 20E, in a vertical, co-planar stacked arrangement to increase the overall height of any wall of the article storage container 10. The vertical connector means 70 is in the form of a solid body having opposed ends 72 and 74 interconnected by a reduced width central portion 76. The opposed faces or side edges of the vertical connector 70 are formed in an angular or faceted arrangement complementary to the polygonal shape of the side ends of the panel sections of each of the panels 20. In this manner, the vertical connector 70 may be slid into a slot 47 formed between the first end 42 of the connector web 40 on certain of the panels, such as panel 20B, and is held in place between the adjoining side edges of the panel sections 50 and 26, as shown in FIG. 3.

A portion of the connector member 70 extends outward above the first edge 28 of the panel 20B a distance equal to the length of the slots 46 so as to releasably engage a slot 46 formed in a like panel member 20E which is inverted 180° in orientation from the panel 20B. The outwardly extending portion of the vertical connector 70 engages the side edges of the panel sections 50 and 26 of the panel 20E to securely connect the panels 20B and 20E together in a vertical, co-planar, stacked arrangement.

Another feature of the present invention is shown in FIG. 2 in which weight reducing cutouts in the form of apertures 84 are formed in certain portions of the panel sections 22, 24 and 26 of each panel 20. The apertures 84 are illustrated as having a square configuration by way of example only. It will be understood that the shape of the apertures 84 as well as their number may be varied to meet the needs of a particular application while retaining sufficient strength for the panel 20. Similar cutouts 86 are formed in each of the connector webs 40.

Further, the end panel sections 50 and 52 of each panel 20 have an open outer end, also for weight reducing purposes. Each end panel section 50 and 52 is provided with a side edge with the predetermined angular side edge faces described above and an outer wall 88. However, the remaining sides of each end panel section 50 and 52 are open. A plurality of ribs 90 may be spaced along the length of each end panel section 50 and 52 for rigidity.

In summary, there has been disclosed a unique article storage container designed particularly for use in vehicle storage compartments. The article storage container is easily reconfigurable to different overall configurations and dimensions to suit the particular space requirements of a vehicle storage compartment as well as to provide any number and size of individual article storage compartments therein. The article storage container of the present invention is easily assembled and disassembled. Further, the article storage container is formed of a number of identically constructed panels which reduces manufacturing costs and simplifies the assembly of the article storage container into the desired configuration since only single size panels need be manipulated by the user.

What is claimed is:

1. A reconfigurable article storage container comprising:
    a plurality of identical panels interconnectible into a container of variably arrangeable size, shape and number of panels and containing at least one individual article storage area adjacent at least one of the panels therein, each panel including:
    a plurality of panel sections of identical height, each panel section having first and second spaced edges thereof co-linearly arranged with the first and second edges of adjacent panel section, each panel section having first and second side ends, the side ends of each panel section have a polygonal shape to form flat side end faces planarly engageable with identical flat side end faces of an identical panel when two panels are interconnected in a perpendicular, inverted arrangement;
    a connector web integrally formed with and disposed between the side ends of two adjacent panel sections, each connector web being of a predetermined length and having one end spaced a predetermined distance from one of the first and second edges of the adjacent panel sections; and
    a first connector slot formed between two adjacent panel sections and extending from said one of the first and second edges of the adjacent panel sections to the one end of the connector web;
    the first connector slot of one panel releasably receiving the first connector slot of another panel therein, the another panel being inverted 180° and oriented perpendicular to the one panel.

2. The reconfigurable article storage container of claim 1 wherein:
    each connector web has a thickness less than the thickness of the panel sections.

3. The reconfigurable article storage container of claim 1 wherein:
    the panel sections and the connector webs of each panel are formed as a one-piece, integrally constructed member.

4. The reconfigurable article storage container of claim 3 wherein each panel is formed of molded plastic.

5. The reconfigurable article storage container of claim 1 wherein the panel sections of each panel comprises:
    a first panel section of a first predetermined length; and
    two second panel sections having a length different from the length of the first panel section and disposed adjacent to opposite side ends of the first panel section and connected thereto by connector webs.

6. The reconfigurable article storage container of claim 5 wherein each second panel section has a shorter length than the first panel section.

7. The reconfigurable article storage container of claim 5 wherein each panel further comprises:
    first and second end panel sections, each attached by a connector web to o ne of the second panel sections; and
    first and second opposed connector slots formed between each of the first and second end panel sections, the adjacent one of the second panel sections and the connector web therebetween.

8. The reconfigurable article storage container of claim 1 further including:
weight reducing apertures of a predetermined size and shape formed in a major portion of the surface area of each panel section.

9. The reconfigurable article storage container of claim 1 further including:
the side end connecting means, releasably attachable to outermost side ends of two adjacently disposed coplanar arranged panels and disposed completely between the first and second edges of the two panels, for connecting the two panels in a lengthwise extending, co-planar arrangement.

10. The reconfigurable article storage container of claim 1 further including:
a vertical connector member having flat end faces, mountable in two vertically aligned connector slots formed between a connector web and one of the first and second edges each of two vertically disposed panel sections and extending outward from one panel into the other panel, for releasably engaging and interconnecting the two panels in a stacked, vertical, co-planar arrangement.

11. The reconfigurable article storage container of claim 10 wherein the vertical connector member comprises:
a body having an exterior surface shaped complementary to the shape of the side end faces of the panel sections to releasably engage the side end faces of two edge-to-edge disposed panels.

12. The reconfigurable article storage container of claim 10 wherein:
a second connector slot is formed between the two adjacent panel sections and extends from the second edges of the two adjacent panel sections to another end of the connector web; and
the vertical connector member has a height to engage the second connector slot of one panel and the first connector slot of another panel when the one and another panels are disposed vertically adjacent to each other.

13. The reconfigurable article storage container of claim 1 wherein:
each second connector slot has a length equal to one-half of the distance between the first and second edges of the adjacent panel sections.

14. A reconfigurable article storage container comprising:
a plurality of identical panels interconnectible into a container of variably arrangable size and shape and containing at least one individual article storage compartment therein, each panel including:
a plurality of panel sections of identical height, each panel section having first and second spaced edges thereof co-linearly arranged with the first and second edges of adjacent panel sections, each panel section having first and second side ends spaced from the first and second side ends of an adjacent panel section;
a connector web integrally formed with and disposed between the side ends of two adjacent panel sections, each connector web being of a predetermined length and having one end spaced a predetermined distance from the second edges of the adjacent panel sections;
a connector slot formed between two adjacent panel sections and extending from the second edges of the adjacent panel sections to the one end of the connector web for releasably receiving an identical connector slot of another panel therein, the another panel being inverted 180° and oriented perpendicular to the other interconnected panel;
the side ends of each panel section have a polygonal shape to form flat side end faces planarly engageable with identical flat side end faces of an identical panel when the two panels are interconnected in a perpendicular, inverted arrangement; and
side end connecting means, releasably attachable to outermost side ends of two panels, for connecting the two panels in a lengthwise extending, co-planar arrangement;
the side end connecting means having first and second end portions formed of spaced first and second legs, the first and second legs having a shape complementary to the shape of the side ends of the panels for releasably engaging the side ends of the panels.

15. The reconfigurable article storage container of claim 14 wherein the side end connecting means further comprises:
a central leg extending between the first and second end portions and insertable between the outermost ends of two co-linearly arranged panels.

16. A reconfigurable article storage container comprising:
a plurality of identical panels interconnectible into a container of variably arrangable size and shape and containing at least one individual article storage compartment therein, each panel including:
a plurality of panel sections of identical height, each panel section having first and second spaced edges thereof co-linearly arranged with the first and second edges of adjacent panel sections, each panel section having first and second side ends spaced from the first and second side edges of an adjacent panel section;
a connector web integrally formed with and disposed between the side ends of two adjacent panel sections, each connector web being of a predetermined length and having one end spaced a predetermined distance from the second edges of the adjacent panel sections;
each connector web having a thickness less than the thickness of the first and second edges of the panel sections;
a connector slot formed between two adjacent panel sections and extending from the second edges of the adjacent panel sections to the one end of the connector web for releasably receiving an identical connector slot of another panel therein, the another panel being inverted 180° and oriented perpendicular to a connected panel, each connector slot having a length equal to one-half of the distance between the first and second edges of the adjacent panel sections;
all of the first and second side ends of each of the panel sections have a polygonal shape with side end faces disposed at an interior angle less than 90° from each other; and
side end connecting means, releasably attachable to outermost side ends of two panels, for connecting the two panels in a lengthwise extending, co-planar arrangement;

the side end connecting means having first and second end portions formed of spaced first and second legs, the first and second legs having a shape complementary to the shape of the side ends of the panels for releasably engaging the side ends of the panels; and a central leg extending between the first and second end portions and insertable between the outermost first and second ends of two co-linearly arranged panels.

* * * * *